US008842565B2

(12) United States Patent
Ren et al.

(10) Patent No.: US 8,842,565 B2
(45) Date of Patent: *Sep. 23, 2014

(54) ALLOCATION OF ACKNOWLEDGEMENT CHANNELS TO CHANNEL GROUPS HAVING FIXED TRANSMIT ENERGIES

(75) Inventors: Hong Ren, Kanata (CA); Xixian Chen, Ottawa (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 223 days.

This patent is subject to a terminal disclaimer.

(21) Appl. No.: 13/392,300

(22) PCT Filed: Dec. 31, 2010

(86) PCT No.: PCT/IB2010/056147
§ 371 (c)(1),
(2), (4) Date: Feb. 24, 2012

(87) PCT Pub. No.: WO2012/090029
PCT Pub. Date: Jul. 5, 2012

(65) Prior Publication Data
US 2012/0170479 A1     Jul. 5, 2012

(51) Int. Cl.
*H04L 5/00* (2006.01)
*H04L 1/16* (2006.01)

(52) U.S. Cl.
CPC ............. *H04L 5/0055* (2013.01); *H04L 1/1692* (2013.01); *Y02B 60/50* (2013.01)
USPC ....................................................... 370/252

(58) Field of Classification Search
None
See application file for complete search history.

(56) References Cited

U.S. PATENT DOCUMENTS

| | | | | |
|---|---|---|---|---|
| 2007/0242652 | A1* | 10/2007 | Dahlman et al. | 370/342 |
| 2010/0061359 | A1* | 3/2010 | Fukuoka et al. | 370/342 |
| 2010/0067464 | A1* | 3/2010 | Higuchi | 370/329 |
| 2011/0263286 | A1* | 10/2011 | Damnjanovic et al. | 455/513 |

(Continued)

FOREIGN PATENT DOCUMENTS

| | | |
|---|---|---|
| WO | 2006031177 A1 | 3/2006 |
| WO | 2011000673 A2 | 1/2011 |

OTHER PUBLICATIONS

3rd Generation Partnership Project. "Updated E-UTRAN TDD Test Models." 3GPP Draft, 3GPP TSG-RAN WG4 #48bis, R4-082610, Edinbrugh, UK, Sep. 29-Oct. 22, 2008.

*Primary Examiner* — Chirag Shah
*Assistant Examiner* — Jael Ulysse
(74) *Attorney, Agent, or Firm* — Coats and Bennett, PLLC

(57) ABSTRACT

A method and apparatus is provided for assigning resources for an acknowledgement channel, such as the PHICH in LTE systems. A list of acknowledgement channels for a group of scheduled mobile terminals is generated. The list is sorted in descended order of the required transmit energies for the corresponding mobile terminals. The acknowledgement channels are then assigned to channel groups one at a time in sorted order to an available channel group with the lowest cumulative transmit energy. By sorting the channel list before assigning resources, the variance in the transmit energies for different channel groups is reduced. Given enough number of acknowledgement channel groups, the small variance in the transmit energies for different channel groups implies improved error rate performance.

26 Claims, 9 Drawing Sheets

(56) References Cited

U.S. PATENT DOCUMENTS

| | | | |
|---|---|---|---|
| 2012/0008556 A1* | 1/2012 | Noh et al. | 370/328 |
| 2012/0026985 A1* | 2/2012 | Ren et al. | 370/336 |
| 2012/0243497 A1* | 9/2012 | Chung et al. | 370/329 |
| 2012/0307755 A1* | 12/2012 | Kim et al. | 370/329 |
| 2013/0021898 A1* | 1/2013 | Kang et al. | 370/216 |
| 2013/0044722 A1* | 2/2013 | Kang et al. | 370/329 |
| 2013/0279447 A1* | 10/2013 | Noh et al. | 370/329 |
| 2013/0286918 A1* | 10/2013 | Park et al. | 370/311 |

* cited by examiner

ALLOCATION OF ACKNOWLEDGEMENT CHANNELS TO CHANNEL GROUPS HAVING FIXED TRANSMIT ENERGIES

BACKGROUND

The present invention relates generally to acknowledgement of uplink transmissions in a mobile communication system and, more particularly, to resource allocation for acknowledgment channels.

A Hybrid Automatic Repeat Request (HARQ) protocol is used for uplink transmission in Long Term Evolution (LTE) systems. When a mobile terminal transmits data on the assigned uplink resources, the base station sends an acknowledgement signal to the mobile terminal to indicate whether the uplink transmission was successful. The acknowledgement signal comprises a single bit that is set to 0 for a positive acknowledgement (ACK) or to 1 for a negative acknowledgement (NACK). The acknowledgement signal is transmitted on a dedicated control channel called the Physical HARQ Indicator Channel (PHICH). Each mobile terminal is assigned to a respective PHICH.

In LTE, the PHICHs for multiple mobile terminals are divided into PHICH groups. In FDD (Frequency Division Duplex) mode, the number of PHICH groups is constant in all subframes and is determined by system bandwidth and a higher layer configuration parameter. In TDD (Time Division Duplex) mode, the number of PHICH groups may vary between subframes. Each PHICH group can have up to eight channels, which all share the same resource elements. The PHICHs within a group are assigned different orthogonal spreading sequences to separate the channels within a PHICH group using code division multiplexing (CDM). A PHICH resource is identified by an index pair $(n_{group}, m_{seq})$, where $n_{group}$ is the PHICH group number and $m_{seq}$ is the index of the orthogonal sequence within the group.

For proper operation of the HARQ protocol, the error rate of the PHICH should be sufficiently low. Typically, the target error rate should be in the order of $10^{-2}$ for ACKs and $10^{-3}$ to $10^{-4}$ for NACKs. Because the mobile terminals do not all experience the same channel conditions, the assignment of PHICHs/mobile terminals to PHICH groups should be done in a manner to ensures that the transmit energy allocated to the PHICH for each mobile terminal is sufficient for the reliable detection of the acknowledgement signal by the mobile terminal.

SUMMARY

The present invention provides a method and apparatus for assigning resources for an acknowledgement channel, such as the PHICH in LTE systems. A list of acknowledgement channels for a group of scheduled mobile terminals is generated. The list is sorted in descending order of the required Transmit Energy Per Resource Element (TEPRE) for the corresponding mobile terminals. The acknowledgement channels are then assigned to channel groups one at a time in sorted order to an available channel group with the lowest cumulative transmit energy. By sorting the channel list before assigning resources, the variance in the transmit energies for different channel groups is reduced.

Some embodiments of the invention comprise a method implemented by a base station of assigning resources on a downlink control channel to a group of acknowledgment channels for sending acknowledgement signals to a group of scheduled mobile terminals transmitting on an uplink traffic channel. In one exemplary method, a TEPRE for each acknowledgement channel is determined based on the downlink channel conditions experienced by a corresponding mobile terminal assigned to the acknowledgement channel. The acknowledgement channels are then assigned, in sorted order depending on the TEPRE, to a channel group. The acknowledgement channels in the same channel groups share the same downlink resources.

Other embodiments of the invention comprise a base station to implement the above described method. In one embodiment, the base station comprises a transceiver for communicating with a mobile terminal, and a control unit connected to the transceiver. The control unit comprises a retransmission controller to send acknowledgment signals to the mobile terminals over respective acknowledgement channels to acknowledge uplink transmissions from said of mobile terminals, and a scheduler to schedule the uplink transmission from said mobile terminals. The scheduler also assigns resources on a downlink control channel to said acknowledgment channels. More particularly, the scheduler determines, for each acknowledgement channel, a transmit energy based on the channel conditions experienced by a corresponding mobile terminal assigned to the acknowledgement channel and assigns, in sorted order depending on the transmit energy, each acknowledgement channel to a channel group. The acknowledgement channels in the same channel groups share the same downlink resources.

The embodiments of the invention distribute the PHICHs across channel groups in a manner that keeps the required transmit energy for all channel groups as equal as possible. The variance in the required transmit energy for different groups is reduced by sorting the acknowledgement channels for the mobile terminals in descending order of transmit energy per resource element. When the TEPRE for each channel group is fixed, sorting the channel list can improve error rate performance. When the TEPRE for each channel group is not fixed, sorting the channel list can minimize the probability of strong inter-cell interference at certain RE locations.

DETAILED DESCRIPTION

Figure 1:
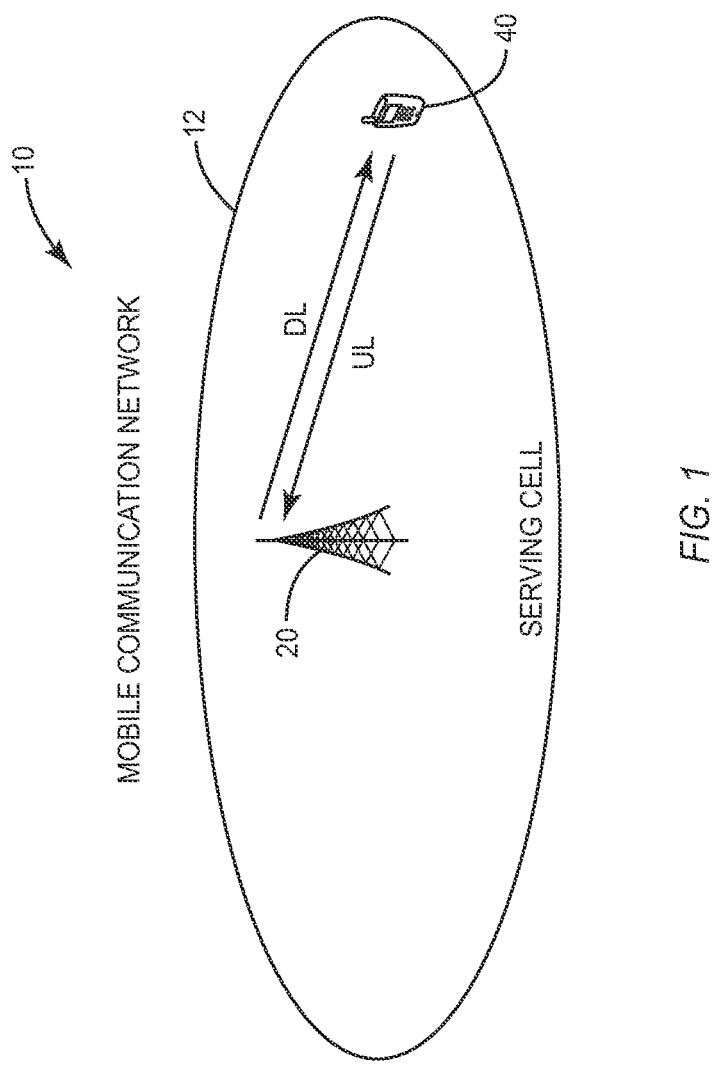
FIG. 1 illustrates a mobile communication system.

Referring now to the drawings, FIG. 1 illustrates a mobile terminal 40 in a mobile communication network 10. The mobile terminal 40 may comprise, for example, a cellular telephone, personal digital assistant, smart phone, laptop computer, handheld computer, or other device with wireless communication capabilities. Mobile terminal 40 communicates with a base station 20 in a serving cell or sector 12 of the mobile communication network 10. The mobile terminal 40 receives signals on one or more downlink (DL) channels and transmits signals to the base station 20 on one or more uplink (UL) channels.

For illustrative purposes, an exemplary embodiment of the present invention will be described in the context of a Long-Term Evolution (LTE) system. Those skilled in the art will appreciate, however, that the present invention is more generally applicable to other wireless communication systems, including Wideband Code-Division Multiple Access (WCDMA) systems and WiMax (IEEE 802.16) systems. In LTE, the mobile terminal 40 is referred to as user equipment (UE) and the base station 20 is referred to as a NodeB or Enhanced NodeB (eNodeB). The generic terms mobile terminal 40 and base station 20 are used herein except where otherwise noted.

Figure 2:
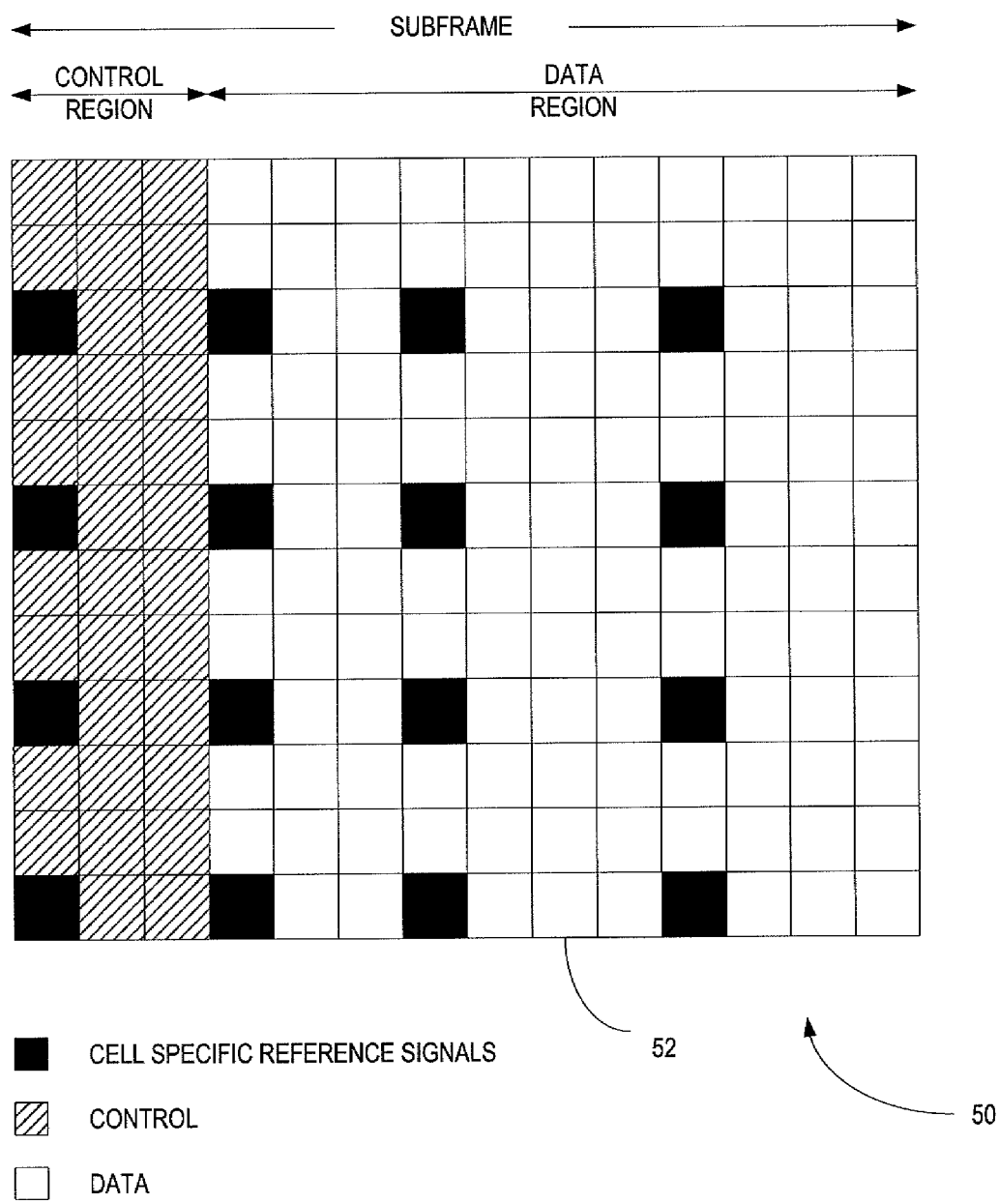
FIG. 2 illustrates a time-frequency grid for an exemplary communication system based on the Long Term Evolution (LTE) standard.

LTE uses Orthogonal Frequency Division Multiplexing (OFDM) in the downlink and Single-Carrier OFDM (SC_OFDM) in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element (RE) 52. A resource element 52 comprises one OFDM subcarrier during one OFDM symbol interval.

Figure 3:
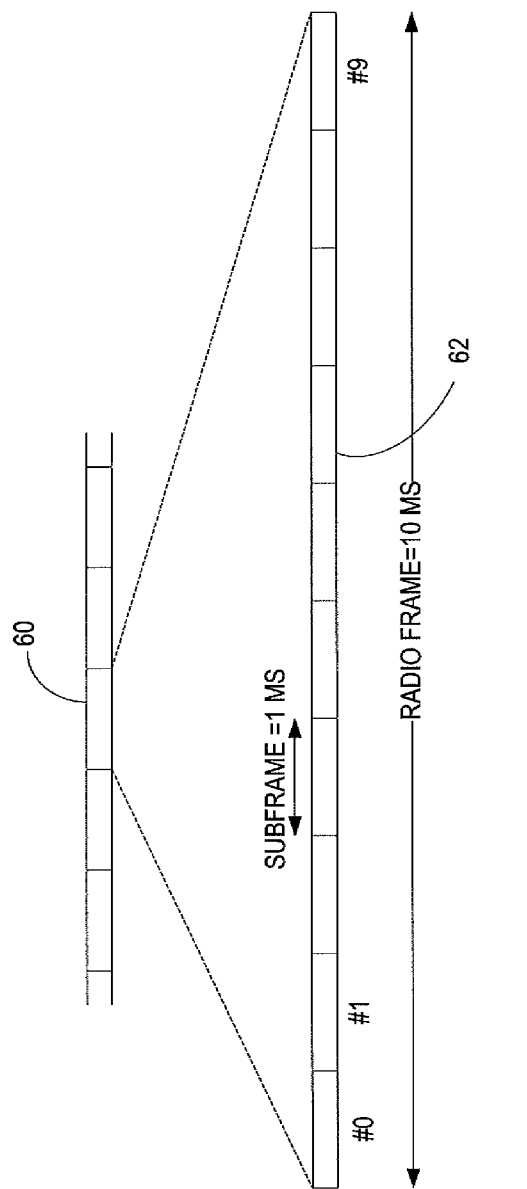
FIG. 3 illustrates an exemplary radio frame in a LTE system.

In LTE systems, data is transmitted from the mobile terminals 40, to the base 20 station on the Physical Uplink Shared Channel (PUSCH). The PUSCH is a time and frequency multiplexed channel shared by a plurality of mobile terminals 40. As shown in FIG. 3, the uplink transmissions are organized into 10 ms radio frames 60. Each radio frame comprises ten equally-sized subframes 62. For purposes of scheduling uplink transmissions, the time-frequency resources are allocated in units called resource blocks (RBs). Each resource block spans twelve adjacent subcarriers in the frequency domain, and one 0.5 ms slot (one half of one subframe). The term "resource block pair" refers to two consecutive resource blocks occupying an entire one millisecond subframe.

When a mobile terminal 40 has data to send on the uplink, the mobile terminal 40 sends a scheduling request to the serving base station 20. The scheduling request is sent on the Physical Uplink Control Channel (PUCCH). A scheduler at the base station 20 coordinates transmissions by the mobile terminals on the PUSCH and allocates uplink resources (e.g. resource blocks) to the mobile terminals 40 for uplink transmission on the PUSCH. The base station 20 then sends a scheduling grant to the mobile terminal 40 on the Physical Downlink Control Channel (PDCCH). The scheduling grant includes the resource block allocation for the uplink transmission as well as the modulation and coding scheme to be used for the uplink transmission. The mobile terminal 40 may then transmit data on the assigned uplink resources.

A Hybrid Automatic Repeat Request (HARQ) protocol is used for uplink transmission. When the mobile terminal 40 transmits data on the assigned uplink resources, the base station 20 sends an acknowledgement signal to the mobile terminal 40 to indicate whether the uplink transmission was successful. The acknowledgement signal comprises a single bit that is set to 0 for a positive acknowledgement (ACK) or to 1 for a negative acknowledgement (NACK). The acknowledgement signal is transmitted on a dedicated control channel called the Physical HARQ Indicator Channel (PHICH), which is also referred to herein generically as an acknowledgement channel. Each mobile terminal 40 is assigned to a respective PHICH. To increase robustness, each HARQ acknowledgement (one single bit of information) is repeated three times.

In LTE, the PHICHs for multiple mobile terminals 40 are divided into PHICH groups, which are also referred to herein as channel groups. In Frequency Division Duplex (FDD) mode, the number of PHICH groups is constant in all subframes and is determined by system bandwidth and a higher layer configuration parameter. In Time Division Duplex (TDD) mode, the number of PHICH groups may vary between subframes. Each PHICH group can have up to eight channels, which all share the same resource elements. The PHICHs within a group are assigned different orthogonal spreading sequences to separate the channels within a PHICH group using code division multiplexing (CDM). Thus, the total energy allocated to a group is shared by all of the PHICHs within the PHICH group.

In LTE, a PHICH resource is identified by an index pair $(n_{group}, m_{seq})$, where $n_{group}$ is the PHICH group number and $m_{seq}$ is the orthogonal sequence within the group. The computation of the indices $n_{group}$ and $m_{seq}$ is specified by the LTE standard. More particularly, the group index $n_{group}$ is given by:

$$n_{group} = (I_{PRB}^{Index} + n_{DMRS}) \bmod N_{group} + \alpha N_{group} \qquad \text{Eq. 1}$$

and the sequence index is given by:

$$m_{seq} = (\lfloor I_{PRB}^{Index}/N_{group} \rfloor + n_{DMRS}) \bmod 2N_{SF} \qquad \text{Eq. 2}$$

where $I_{PRB}^{Index}$ is the resource block (RB) index of the lowest Physical Resource Block (PRB) in the first slot of the corresponding PUSCH transmission, $n_{DMRS}$ is mapped from the cyclic shift of the Demodulation Reference Signal (DMRS) field in the most recent Downlink Control Information (DCI) format 0 uplink (UL) scheduling grant sent to the mobile terminal 40. For a semi-persistently configured PUSCH initial transmission or a PUSCH transmission associated with a random access response grant, $n_{DMRS}$ is set to zero. $N_{SF}$ is the spreading factor for the PHICH, and $\alpha$ is a configuration parameter. The resource block index $I_{PRB}^{Index}$ is sent by the base station 20 in the scheduling grant to indicate the uplink resources allocated to the mobile terminal 40 for the uplink transmission. The spreading factor $N_{SF}$ is 4 for a normal cyclic prefix and 2 for the extended cyclic prefix.

For a PUSCH transmission, $I_{PRB}^{Index}$ is determined by a scheduler 32 at the base station 20 based on many factors, including the type and amount of the buffered data at the mobile terminal 40, and the channel conditions experienced by the mobile terminal 40. On the other hand, $n_{DMRS}$ can be chosen from up to 8 possible integers, from 0 to 7. Once $I_{PRB}^{Index}$ is determined, the resource allocation for a given PHICH reduces to the selection of $n_{DMRS}$.

For proper operation of the HARQ protocol, the error rate of the PHICH should be sufficiently low. Typically, the target error rate should be in the order of $10^{-2}$ for ACKs and $10^{-3}$ to $10^{-4}$ for NACKs. Because the mobile terminals 40 do not all experience the same channel conditions, the assignment of PHICHs/mobile terminals 40 to PHICH groups should be done in a manner to ensures that the transmit energy allocated to the PHICH for each mobile terminal 40 is sufficient for the reliable detection of the acknowledgement signal by the mobile terminal 40. For example, mobile terminals 40 close to a cell edge are likely to experience poor channel conditions while mobile terminals 40 near the base station 20 are likely to have good channel conditions. Consequently, higher transmit energy should be allocated to the PHICH for mobile terminals 40 near the cell edge to ensure that the PHICH is reliably received. Conversely, mobile terminal 40 with good channel conditions can reliably receive the PHICH at lower transmit energy levels. Additionally, the allocation of resources and transmit energy should spread the PHICH channels over the PHICH groups to maximize resource utilization as much as possible.

With the assumptions that the transmit energy per resource element (TEPRE) is the same for all PHICH groups and is fixed, the TEPRE allocated to a specific PHICH/mobile terminal 40 is affected by the number of PHICHs/mobile terminals 40 assigned to the same PHICH group and the channel conditions of the other mobile terminals 40 in the PHICH group. A PHICH for a mobile terminal 40 with very poor channel conditions should be the only PHICH/mobile terminal 40 in a given PHICH group to ensure sufficient energy for reliable PHICH detection.

When a large number of mobile terminals 40 are scheduled to transmit on the PUSCH, reducing group size to enable reliable detection of the PHICH for some mobile terminals 40 implies the need for a larger number of groups. Each PHICH group uses the same number of resource elements, so increasing the number of PHICH groups means that more resource elements will be used by the PHICH groups and fewer resource elements will be available for the PDCCH. In practice, the number of PHICH groups reflects a trade-off between PHICH resources and PDCCH resources. Thus, while it may be desirable to assign PHICHs/mobile terminals 40 with poor channel conditions to a PHICH group by itself, there may not be sufficient PHICH resources, or it may require a large number of PHICH groups with less resources for each group. Thus, it is likely that some PHICHs for mobile terminals 40 with poor channel conditions will be assigned to PHICH groups with other PHICHs/mobile terminals 40 and thus have to share the transmit energy allocated to the group with other PHICHs/mobile terminals 40.

In order to minimize the impact on error rate performance, the PHICHs/mobile terminals 40 should be distributed across PHICH groups in a manner that keeps the required TEPRE for all PHICH groups as equal as possible given the assumption that the TEPRE is a fixed constant for all PHICH groups and the number of PHICH groups is configured to be large enough. A simple method is to assign the PHICHs one at a time to channel groups and select an orthogonal sequence.

Figure 4:
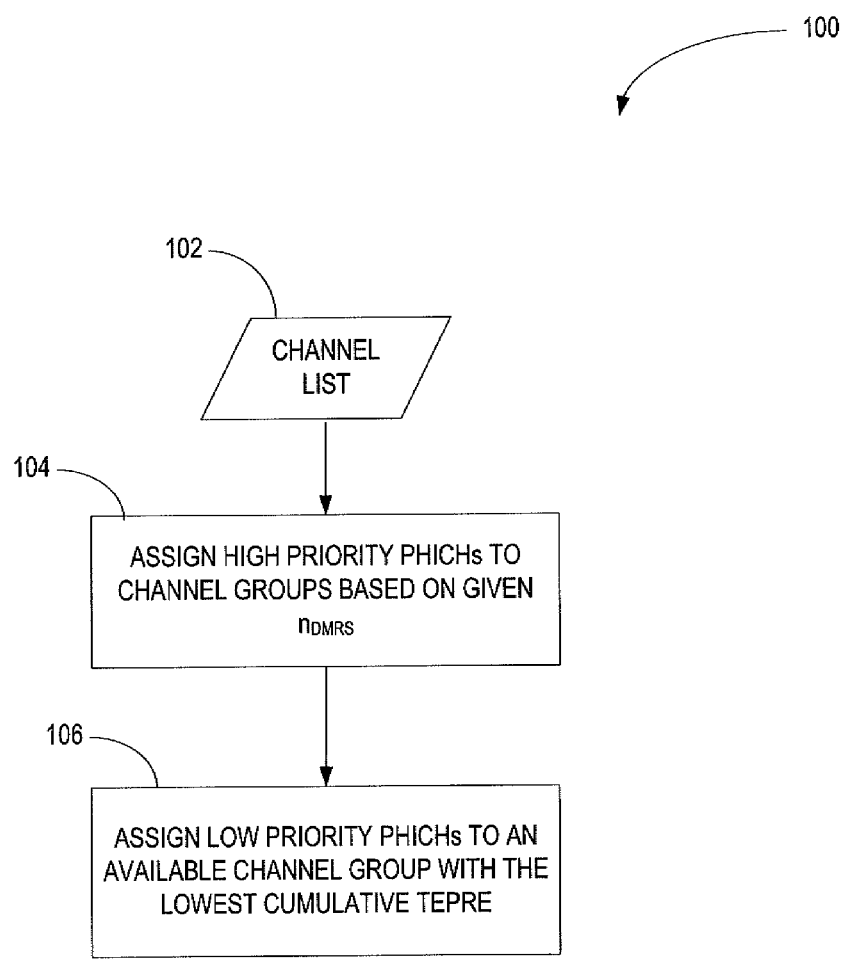
FIG. 4 illustrates an exemplary resource allocation method according to one embodiment.

FIG. 4 illustrates an exemplary method 100 for assigning PHICH resources, which may be implemented by the scheduler 32 (FIG. 8) at the base station 20. After scheduling mobile terminals 40 for transmission on the uplink, the scheduler 32 generates a list of PHICHs for the scheduled mobile terminals 40 (block 102). The list is referred to herein as the channel list. As noted previously, there is an one-to-one correspondence between the PHICHs in the channel list and the scheduled mobile terminals 40. The scheduler 32 assigns each PHICH one at a time to a channel group and selects an orthogonal spreading sequence (blocks 104-106). During the assignment process, PHICH resources are first allocated to PHICHs for mobile terminals 40 that do not require a Downlink Control Information (DCI) format 0 uplink grant (block 104). This group of channels, referred to herein as the high priority group, includes PHICHs for: 1) semi-persistently scheduled PUSCH transmissions; 2) PUSCH transmissions associated with random access response grants; and 3) PUSCH HARQ retransmissions for which $n_{DMRS}$ remains the same as the initial transmission. For these high priority PHICH channels, $n_{DMRS}$ is fixed and can't be arbitrarily changed. The PHICH group and orthogonal spreading sequence are identified based on the given $n_{DMRS}$ and marked as unavailable. PHICH resources are then assigned to the remaining PHICHs/mobile terminals 40, referred to herein as the low priority group (block 106). In this case, there is more flexibility in assigning PHICH resources because the cyclic shift of the DMRS is not already determined. As noted previously, once the lowest resource block for an uplink transmission is determined, the assignment of PHICH resources reduces to the selection of the cyclic shift for the DMRS. As described in more detail below, PHICHs in this group are assigned one at a time in any order to the PHICH group with the lowest cumulative TEPRE.

Figure 5:
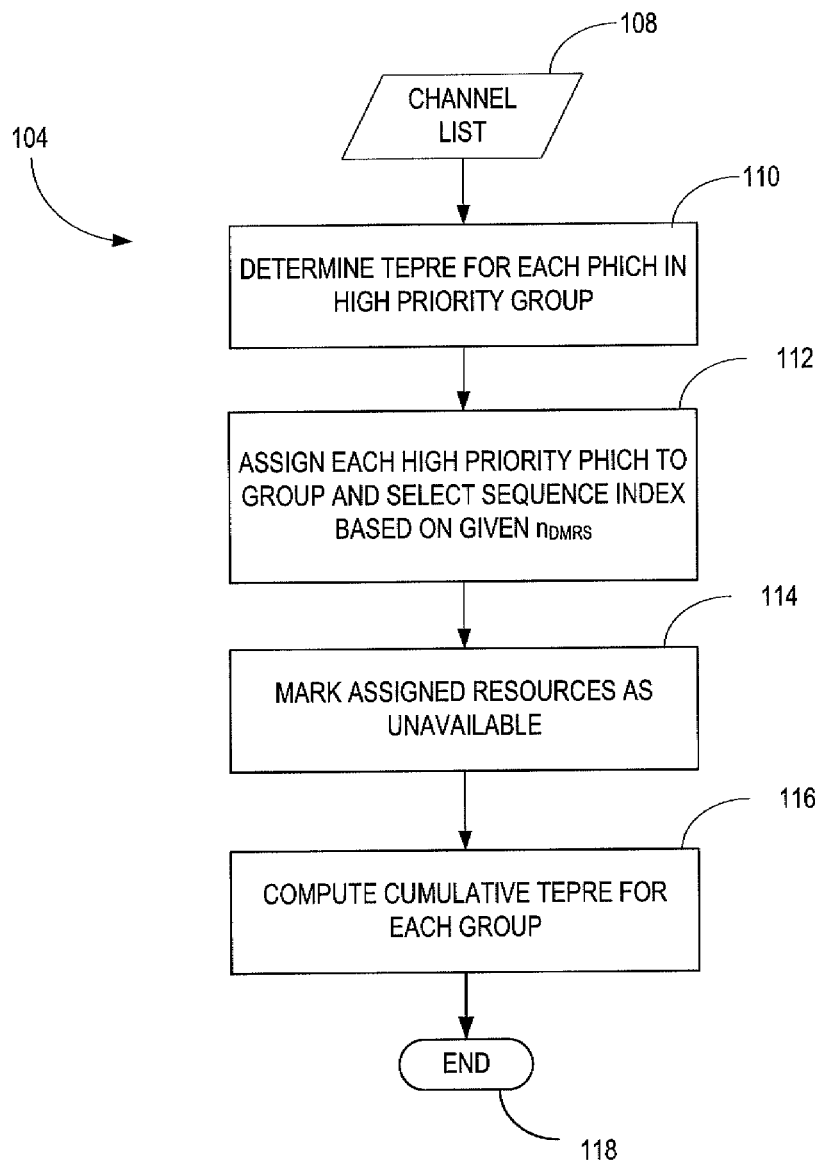
FIG. 5 illustrates resource allocation method for a high priority channel.

FIG. 5 illustrates in more detail how resources are assigned to PHICHs in the high priority group (block 104 in FIG. 4). The scheduler 32 begins with a channel list including the high priority PHICHs (block 108). The scheduler 32 determines a required transmit TEPRE for each PHICH in the high priority group based on the downlink channel conditions and quality of service (QoS) requirements of the corresponding mobile terminal 40 (block 110). The scheduler 132 then processes the PHICHs in the high priority group in any order. Based on the given $n_{DMRS}$ for each PHICH in the high priority group, the scheduler 132 derives the group number and sequence index and assigns the corresponding resource (block 112), which is then marked as unavailable (block 114). As the PHICHs are assigned, the cumulative TEPRE for the corresponding PHICH group is updated (block 116). The scheduler 132 then processes the PHICHs in the low priority group.

Figure 6:
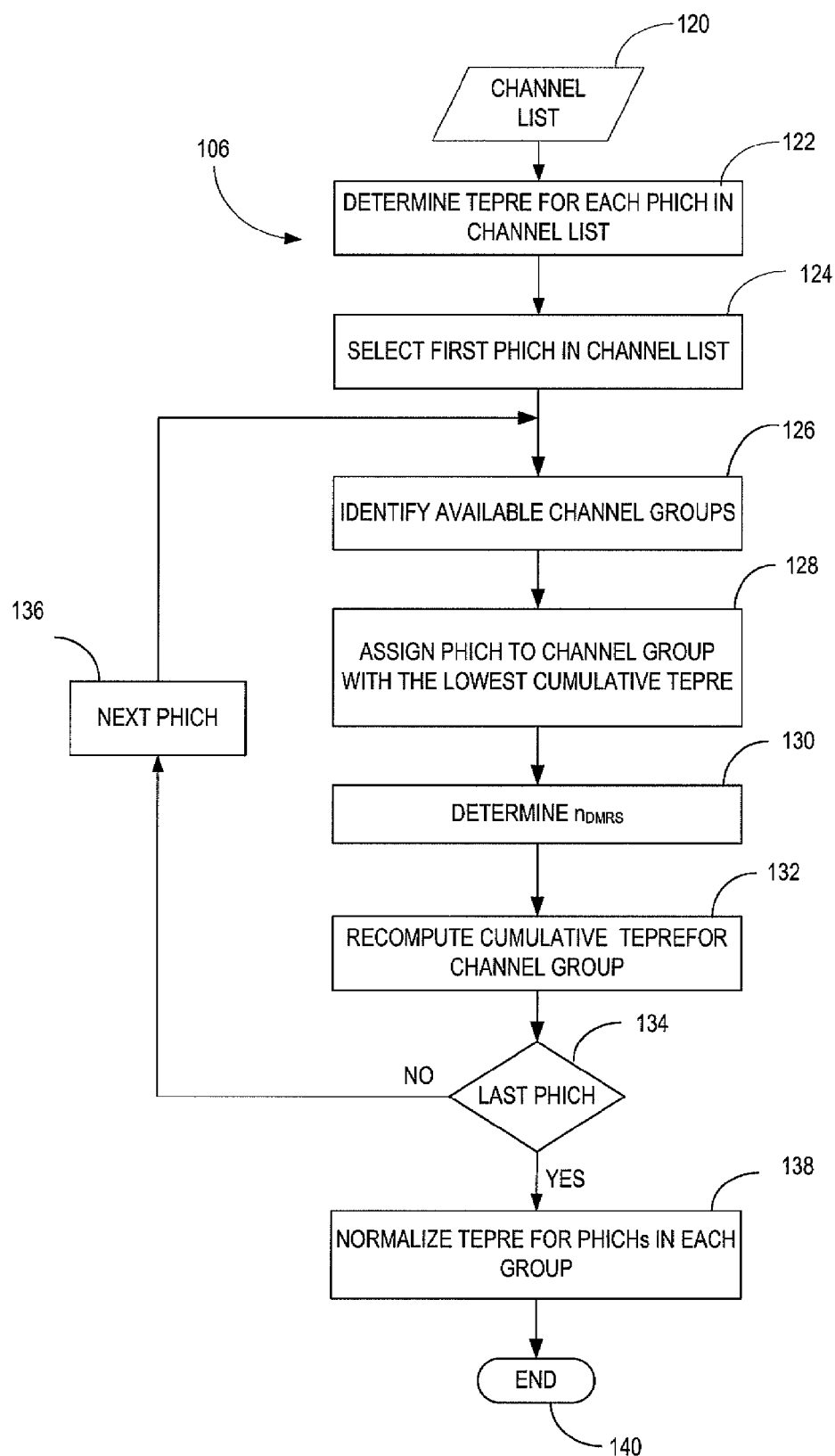
FIG. 6 illustrates resource allocation method for a low priority channel according to a first embodiment.

FIG. 6 illustrates in more detail how PHICH resources are assigned to PHICHs in the low priority group (block 106 in FIG. 4). The scheduler 32 begins with a channel list containing the low priority PHICHs (block 120). The scheduler 32 determines a required transmit TEPRE for each PHICH in the channel list based on the downlink channel conditions and quality of service (QoS) requirements of the corresponding mobile terminal 40 (block 122). As previously noted, the required TEPRE is the actual TEPRE needed to ensure a desired error performance criterion. It will be appreciated that the TEPRE for low priority PHICHs may be computed at the same time as the TEPRE for the high priority PHICHs. The scheduler 32 then selects the first PHICH in the low priority list of scheduled mobile terminals 40 (block 124) and identifies all available PHICH groups to which the PHICH can be assigned (block 126). That is, given $I_{PRB}^{Index}$ and up to eight (8) different $n_{DMRS}$ values, the scheduler 32 identifies all PHICH groups that have the corresponding orthogonal sequence available. The scheduler 32 then selects the PHICH group from the available PHICH groups that has the minimum cumulative TEPRE (block 128). The cumulative TEPRE is the sum of the TEPREs for all previously assigned PHICHs in the PHICH group, including both high priority and low priority PHICHs. Once the PHICH group is selected, the final step in the assignment is to determine the $n_{DMRS}$ that corresponds to the channel group (block 130). The assigned resource is marked as unavailable and the cumulative TEPRE for the PHICH group is recomputed (block 132). After processing each PHICH, the scheduler determines whether there are any unprocessed PHICHs left (block 134). If so, the scheduler 132 selects the next PHICH (block 136) and repeats the process until the last PHICH in the channel list is reached. When the last PHICH in the list is reached, the assignment process ends. The scheduler 132 may then normalize the required TEPRE for each PHICH to the fixed TEPRE per group (block 138). More specifically, when the required TEPRE for one PHICH group is less than the fixed TEPRE per group, the actual TEPRE for each PHICH in the PHICH group may be scaled up so that the actual TEPRE for the PHICH group is equal to the fixed TEPRE per group. On the other hand, when the required TEPRE for one PHICH group is greater than the fixed TEPRE per group, the actual TEPRE for each PHICH in the group is scaled down to ensure the actual TEPRE for the group doesn't exceed the fixed TEPRE. Assume the required TEPRE for PHICH channel i is $\text{TEPRE}_{Req}^i$, and the fixed transmit TEPRE per group is $\text{TEPRE}_{group}$, the actual transmit TEPRE for PHICH channel i is given by:

$$TEPRE_{Actual}^i = TEPRE_{Actual}^i = \frac{TEPRE_{Req}^i * TEPRE_{Group}}{\sum_i TEPRE_{Req}^i} \quad \text{Eq. 3}$$

where the summation is over all PHICH channels in the PHICH group to which PHICH i belongs. The process ends (block 140) after the assignment and/or normalization processes are complete.

To compute the required TEPRE, downlink wideband CQI (Channel Quality Indicator) can be used to represent downlink channel condition. To be more specific, the wideband CQI reported by a mobile terminal can be filtered and then mapped to a signal quality metric, such as a Signal-to-Interference and Noise Ratio (SINR), or channel gain metric, such as a Channel Gain-to-Interference and Noise Ratio (GINR) for the DL Reference Signal (RS). The RS SINR can be adjusted based on PDCCH transmission success or failure to represent PDCCH SINR. One approach to determine the required TEPRE for a PHICH channel is to estimate PHICH SINR as PDCCH SINR, or other control channel signal quality metric, plus an offset. The offset can be obtained from simulation results. The target PHICH SINR that guarantees an acceptable error rate can be obtained from simulations and field test results while the estimated PHICH SINR is obtained with the assumption that the PHICH TEPRE is the same as the RS TEPRE. The required TEPRE for the PHICH in dBm ($\text{TEPRE}_{Req}^{PHICH}$) equals the RS TEPRE in dBm ($\text{TEPRE}^{RS}$) plus target PHICH SINR in dB ($\text{SINR}_{Target}^{PHICH}$), and minus estimated PHICH SINR in dB ($\text{SINR}_{Est}^{PHICH}$). The required TEPRE is thus given by:

$$TEPRE_{Req}^{PHICH} = TEPRE^{RS} + SINR_{Target}^{PHICH} - SINR_{Est}^{PHICH} \quad \text{Eq. 4}$$

Another approach assumes that the required PHICH TEPRE equals a fixed TEPRE minus the RS GINR or other channel gain metric. The fixed TEPRE can be determined based on simulation and field test results. A third approach determines the TEPRE for the PHICH based on a control channel transmit energy, such as the PDCCH TEPRE. More particularly, this approach assumes the required PHICH TEPRE equals the PDCCH TEPRE plus an offset which is the function of the PDCCH coding rate or the number of Control Channel Elements (CCE). The offset can be determined based on simulation and field test results. Because different mobile terminals 40 will have different channel conditions, the required TEPRE will be different for different mobile terminals 40.

The method described above is not optimal from the perspective of PHICH error rate performance. A few PHICHs with high required energies at the end of the channel list could make the cumulative TEPRE for some PHICH groups quite high. Although it is possible to reassign PHICHs if the disparity is large, such multi-pass schemes are not preferred because the processing time can be too long. When the cumulative TEPRE for a group is greater than the fixed transmit EPRE per group, the actual TEPRE is smaller than the required TEPRE after scaling. The higher the cumulative TEPRE, the smaller the actual TEPRE for all PHICH channels in the group. For the PHICH groups with very high cumulative TEPRE, it is likely that all PHICH channels in the groups end up having actual TEPRE much lower than the required TEPRE. Thus, the error rate for these PHICH channels would be much higher than the target error rate. In order to minimize the probability of having the cumulative TEPRE being greater than the fixed TEPRE per group, it is desirable to make the cumulative TEPRE for all groups as close as possible assuming there is enough number of PHICH groups.

Figure 7:
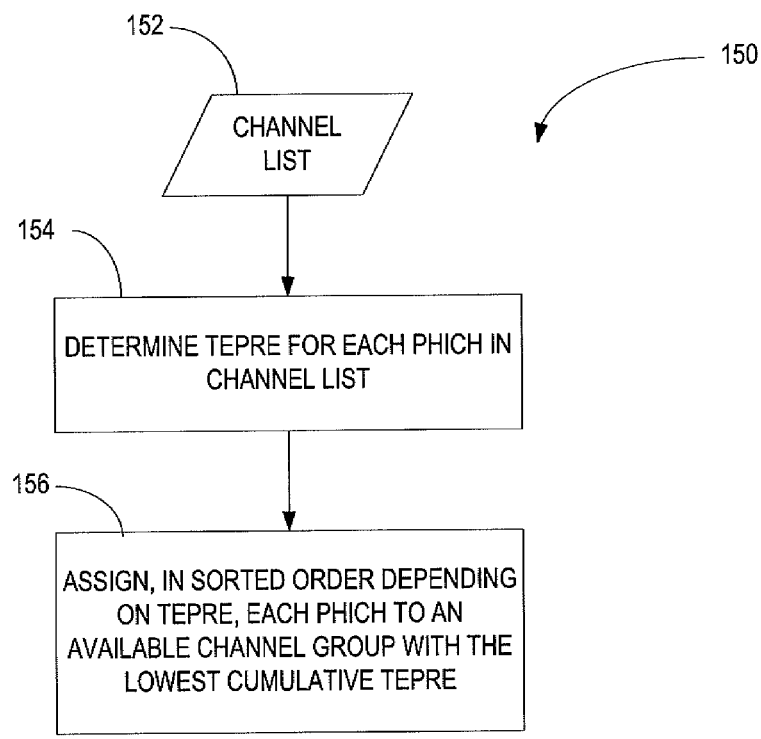
FIG. 7 illustrates resource allocation for a low priority channel according to a second embodiment.

FIG. 7 illustrates an alternate method 150 of assigning PHICH resources to the low priority PHICHs so that the sum of the required transmit energies for all PHICH groups is more uniform with only a slight increase in complexity. After scheduling mobile terminals 40 for transmission on the uplink, the scheduler 32 generates a list of PHICHs for the scheduled mobile terminals 40 (block 152). The scheduler 32 determines the required TEPRE for each PHICH in the channel list based on the channel conditions and quality of service (QoS) requirements of the corresponding mobile terminal 40 (block 154). The scheduler 32 then assigns the PHICHs, in sorted order based on the TEPREs, to an available channel group with the lowest cumulative TEPRE (block 156).

Figure 8:
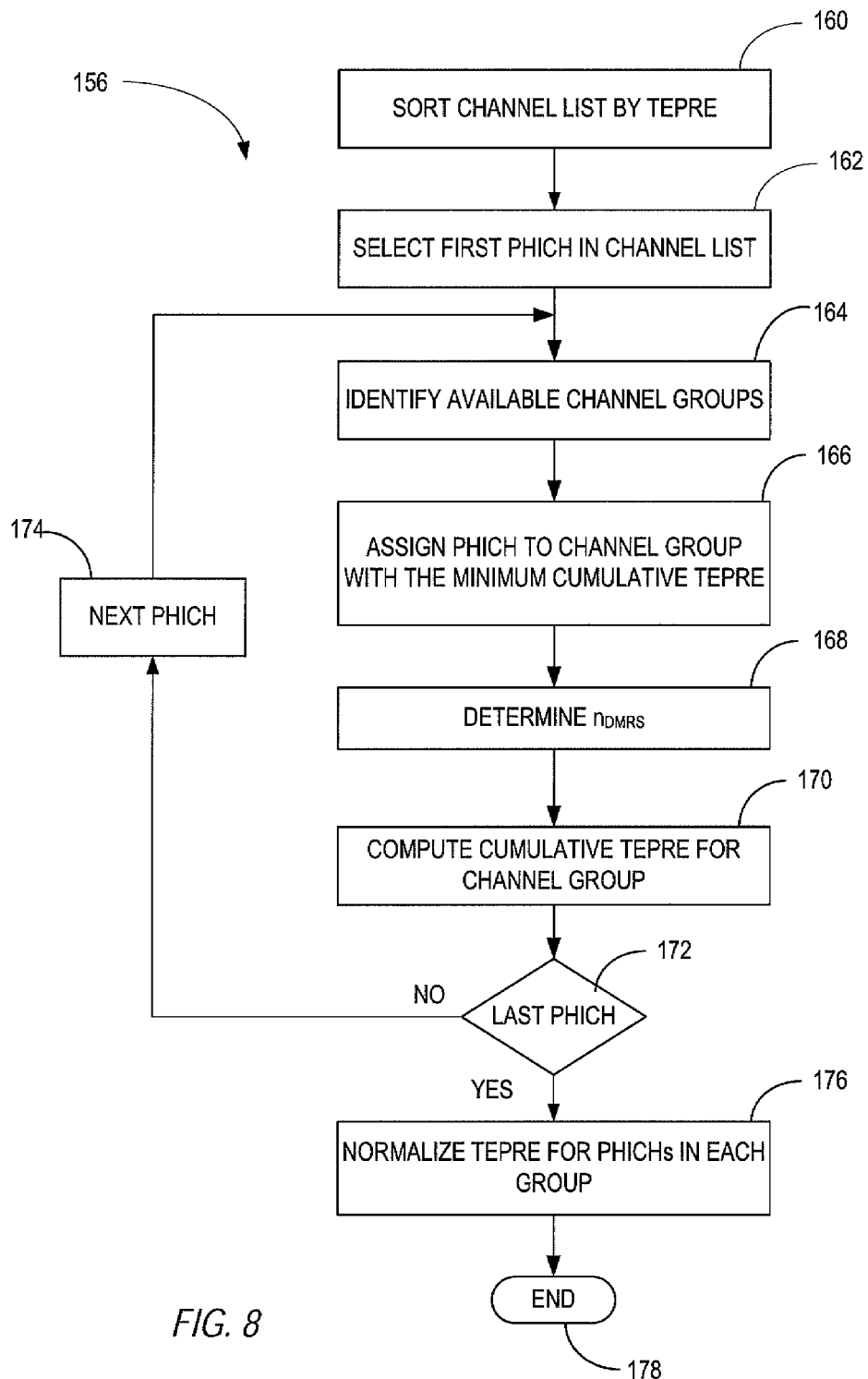
FIG. 8 illustrates in more detail the resource allocation method shown in FIG. 7.

FIG. 8 illustrates in more detail an exemplary assignment process 156 for assigning the low priority PHICHs to channel groups based on the TEPRE. The scheduler initially sorts the PHICHs in the channel list in descending order by TEPRE (block 160). The scheduler 32 selects, in sorted order, the first PHICH in the list of scheduled mobile terminals 40 (block 162) and identifies all available PHICH groups to which the PHICH can be assigned (block 164). That is, given $I_{PRB}^{Index}$ and eight (8) different $n_{DMRS}$ values, the scheduler 32 identifies all PHICH groups that have the corresponding orthogonal sequence available. The scheduler 32 then selects the PHICH group from the available PHICH groups that has the minimum cumulative TEPRE (block 166). Once the PHICH group is selected, the final step in the assignment is to determine the $n_{DMRS}$ that corresponds to an available orthogonal sequence within the channel group (block 168). The assigned resource is marked as unavailable and the cumulative TEPRE for the channel group is computed (block 170). The process is repeated until the last PHICH in the channel list is reached (block 172, 174). When the last PHICH in the list is reached, the assignment process ends. The scheduler 132 may then normalize the required TEPRE for each PHICH to the fixed TEPRE per group as previously described (block 176). The process ends (block 178) after the assignment and normalization processes are complete.

In the case of multiuser MIMO, or virtual MIMO (V-MIMO), the PHICHs for a V-MIMO pair are jointly assigned to PHICH groups. The PHICHs for the mobile terminals 40 in the same V-MIMO pair should not be assigned to the same PHICH group. Further, the distance between the cyclic shifts of DMRS for the corresponding PUSCH transmissions for mobile terminals 40 in the same V-MIMO pair should satisfy some minimum distance criteria. When determining the available PHICH groups for a pair, only those groups having available orthogonal sequences that meet the minimum distance criteria may be considered.

One option is to maximize the difference between the two cyclic shifts (the max difference is $\pi$). This option would be best in terms of PUSCH error rate performance, but it also means that once a cyclic shift is assigned to one mobile terminal in the V-MIMO pair, there is only one choice available for the other mobile terminal. The rule can be relaxed to allow the cyclic shift difference to be other values close to π, such as 5π/6. Of course, the PUSCH error rate performance may be impacted to some extent. As previously noted, a minimum distance between cyclic shifts for mobile terminals 40 in a V-MIMO pair may be required.

Due to the rules of selecting DM RS cyclic shifts for a V-MIMO pair, one mobile terminal's dynamically scheduled initial transmission should not be paired with another mobile terminal's re-transmission for which DCI format 0 UL grant is not required. Also, one mobile terminal's dynamically scheduled initial transmission should not be paired with another mobile terminal's semi-persistently configured transmission for which DCI format 0 UL grant is not required. For a re-transmission for which a DCI format 0 UL grant is not required, or a semi-persistently configured PUSCH transmission, or a PUSCH transmission associated with a random access response grant, $n_{DMRS}$ is fixed for the mobile terminal 40. Due to the rules of selecting DM RS cyclic shifts for a V-MIMO pair, there are likely very few $n_{DMRS}$ values, or possibly only one value, that can be taken by the other mobile terminal 40. Thus, the probability that the corresponding PHICH resources ($n_{group}$, $m_{seq}$) are not available for the V-MIMO pair is not small and can not be ignored. Since there is no easy solution to the problem, it is better to establish some V-MIMO pairing rules to avoid these scenarios.

Exemplary pseudo-code for assigning PHICH resources according to FIGS. 7 and 8 is listed below.

---

Code List 1 - Pseudo Code for PHICH Assignment

```
Input: a list of the scheduled mobile terminals (UEs), and the lowest PRB index of the RBs
assigned in the first slot to each mobile terminal.
Step 0:
Initialize the aggregated energy (A_Energy(n) = 0, n=0, 1,2, ..., N−1) for all PHICH groups. With N
PHICH groups, the group indexes are 0, 1, ... N−1
Step 1:
Let Energy(i) stands for the required TEPRE of UE i. Sort the UE list in a decreasing order of
TEPRE:
Energy (1)>= Energy (2)>=... Energy (M), where M stands for the total number of UEs
Step 2
Take the next unprocessed UE in the high priority group in any order
For the given n_DMRS, derive the group number and the sequence index
Mark the resource as unavailable
Compute the A_Energy for the group
Step 3:
Take the next unprocessed UE (UE i) in the low priority group in sorted order
While not the end of the list
    Get the lowest PRB index, L for the UE
    If the UE is not in V-MIMO
        For DMRS cyclic shift m = 0 to 7
            If the corresponding orthogonal sequence within the group is available
                The cyclic shift is a valid cyclic shift
            End
        End
        Find cyclic shift k such that
        A_Energy ((L+k) mod N) = min A_Energy((L+m) mod N) (m = all valid cyclic
        shifts)
        Assign DMRS cyclic shift k to the UE
        A_Energy ((L + k) mod N) = A_Energy((L + k) mod N) + Power(i)
        Go back to the beginning of step 2
    Else
        For DMRS cyclic shift m = 0 to 7
            If the corresponding orthogonal sequence within the group is available
                The cyclic shift is a valid cyclic shift
            End
        End
        For DMRS cyclic shift m = all valid cyclic shifts for UE i
            For DMRS cyclic shift n = all available cyclic shifts for the other UE j
            based on whatever V-MIMO rules
                If the orthogonal sequence within the group corresponding to n is
                available
                    The cyclic shifts (m, n) is a valid cyclic shift pair
                End
            End
        End
        Find the DMRS cyclic shift pair (k, p) that satisfies
            max {A_Energy((L+m) mod N), A_Energy((L+n) mod N)} is minimum
            A_Energy((L+m) mod N) + A_Energy((L+n) mod N) is minimum
            (m, n) = all valid cyclic shift pairs
        If A_Energy((L+k) mod N) >= A_Energy((L+p) mod N)
            If Energy (i) >= Energy (j)
                Assign k to UE j
                Assign p to UE i
                A_Energy((L+k) mod N) = A_Energy((L+k) mod N) + Energy (j)
                A_Energy((L+p) mod N) = A_Energy((L+p) mod N) + Energy (i)
            Else
                Assign k to UE i
                Assign p to UE j
                A_Energy((L+k) mod N) = A_Energy((L+k) mod N) + Energy (i)
                A_Energy((L+p) mod N) = A_Energy((L+p) mod N) + Energy (j)
```

Code List 1 - Pseudo Code for PHICH Assignment

```
            End
        Else
            If Energy (i) >= Energy (j)
                Assign k to UE i
                Assign (p) to UE j
                A_Energy((L+k) mod N) = A_Energy((L+k) mod N) + Energy (i)
                A_Energy((L+p) mod N) = A_Energy((L+p) mod N) + Energy (j)
            Else
                Assign k to UE j
                Assign (p) to UE i
                A_Energy((L+k) mod N) = A_Energy((L+k) mod N) + Energy (j)
                A_Energy((L+p) mod N) = A_Energy((L+p) mod N) + Energy (i)
            End
        End
        Mark UE j as "Processed"
        Go back to the beginning of step 2
    End
End
```

Figure 9:
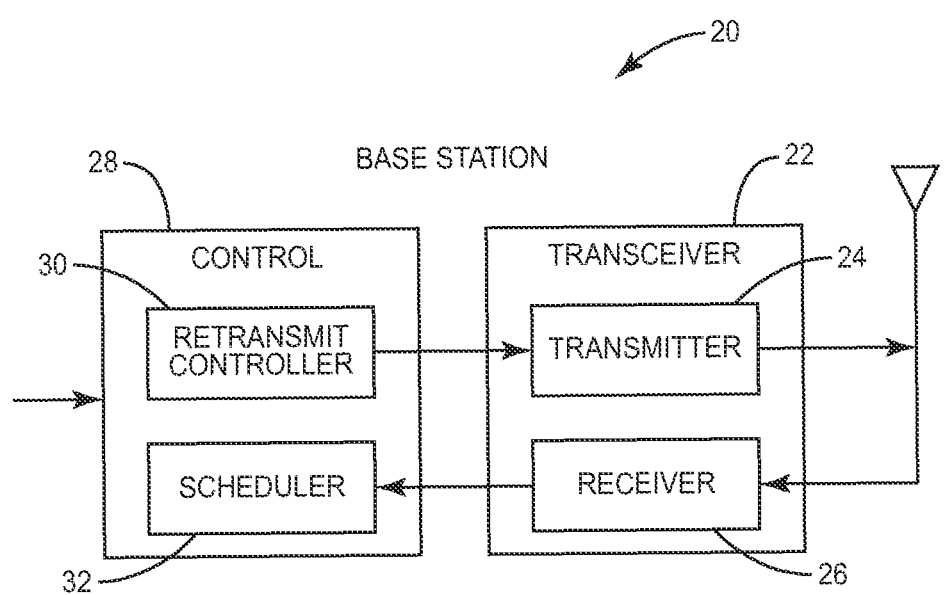
FIG. 9 illustrates an exemplary base station for implementing the resource allocation methods described herein.

FIG. 9 illustrates an exemplary base station 20 implementing the resource allocation methods herein described. The base station 20 generally comprises a transceiver 22 and a control unit 28. The transceiver may comprise, for example, a cellular radio transceiver including a transmitter 24 and receiver 26 that operate according to the LTE standard, or other standard now known or later developed. The control unit 28 controls the operation of the transceiver 22. The control unit includes a retransmit controller 30 and a scheduler 32. The main purpose of the retransmit controller 30 is to acknowledge uplink transmissions from the mobile terminals 40 on the PUSCH as previously described. The scheduler, as previously described, schedules the uplink transmissions and allocates resources for the PHICH as herein described.

The embodiments of the invention minimize the impact on error rate performance by distributing the mobile terminals across channel groups in a manner that keeps the required transmit power for all channel groups as equal as possible. The variance in the required transmit power for different groups is reduced by sorting the acknowledgement channels for the mobile terminals in descending order of transmit energy per resource element. When the TEPRE for each channel group is fixed, sorting the channel list can improve error rate performance. When the TEPRE for each channel group is not fixed, sorting the channel list can minimize the probability of strong inter-cell interference at certain RE locations. The resource allocation methods described herein can be applied to both MD and TDD, with normal or extended cyclic prefix.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a base station of assigning resources on a downlink control channel to a group of acknowledgment channels for sending acknowledgement signals to a group of scheduled mobile terminals transmitting on an uplink traffic channel, the method comprising:
for each acknowledgement channel, determining a required transmit energy per resource element (TEPRE) based on the channel conditions experienced by a corresponding mobile terminal assigned to the acknowledgement channel; and
assigning, in sorted order depending on the required TEPREs, each acknowledgement channel to a channel group, wherein acknowledgement channels in the same channel groups share the same downlink resources; and
wherein determining, for each acknowledgement channel, the required TEPRE based on the channel conditions comprises:
determining a reference signal transmit energy;
estimating a signal quality of the acknowledgement channel;
determining a target signal quality to meet a predetermined error performance requirement; and
computing the required TEPRE for the acknowledgement channel from the reference signal transmit energy, estimated signal quality of the acknowledgement channel, and target signal quality.

2. The method of claim 1, wherein assigning each acknowledgment channel to a channel group comprises:
determining one or more available channel groups based on uplink resources assigned to the corresponding mobile terminal; and
determining, for each available channel group, a cumulative transmit energy for the channel group as a function of the transmit energies of the acknowledgement channels within the channel group; and
assigning the acknowledgement channel to the available channel group with the minimum cumulative transmit energy.

3. The method of claim 2, wherein determining one or more available channel groups based on uplink resources assigned to the corresponding mobile terminal comprises determining, based on the assigned uplink resources, which channel groups have unassigned spreading sequences that can be assigned to the acknowledgement channel.

4. The method of claim 2, wherein determining the cumulative transmit energies for the channel groups comprises summing the required TEPREs of all acknowledgement channels assigned to the channel group.

5. The method of claim 4, further comprising assigning, to each acknowledgement channel, an available spreading sequence within the assigned channel group.

6. The method of claim 5, wherein jointly assigning the acknowledgement channels for a mobile terminal pair to respective channel groups comprises:
determining one or more available channel group pairs based on uplink resources assigned to the mobile terminal pair;

determining, for each available channel group pair, a sum of the cumulative transmit energies for the channel group pair; and assigning the acknowledgement channels to the available channel group pair with the minimum cumulative transmit energies.

7. The method of claim 6, wherein determining one or more available channel groups pairs comprises finding a pair of available channel groups having unassigned spreading sequences that can be assigned to respective ones of the acknowledgement channels so that cyclic shifts of demodulation reference signals for corresponding Physical Uplink Shared Channel transmissions are separated by a predetermined distance.

8. The method of claim 6, wherein determining a sum of the cumulative transmit energies for the channel group pair comprises summing the transmit energies of all acknowledgement channels assigned to the channel group pair.

9. The method of claim 1, for a multiple-input, multiple output (MIMO) system further comprising jointly assigning the acknowledgement channels for a mobile terminal pair to respective channel groups.

10. The method of claim 9, further comprising jointly assigning spreading sequences to the acknowledgement channels for the mobile terminal pair.

11. The method of claim 10, wherein jointly assigning spreading sequences to the acknowledgement channels for the mobile terminal pair comprises assigning spreading sequences from respective channel groups in the channel group pair so that cyclic shifts of demodulation reference signals for corresponding Physical Uplink Shared Channel transmissions are separated by a predetermined minimum distance.

12. The method of claim 1, wherein determining, for each acknowledgement channel, a transmit energy based on the channel conditions comprises:
    determining a channel gain metric for a reference signal;
    computing a required TEPRE from a predetermined fixed transmit energy and the channel gain ratio.

13. The method of claim 1, wherein determining, for each acknowledgement channel, a transmit energy based on the channel conditions comprises:
    determining a control channel transmit energy;
    determining an offset as a function of a coding rate, number of channel elements for the control channel, or both; and
    computing a required TEPRE from the control channel transmit energy and the offset.

14. A base station comprising:
    a transceiver for communicating with a mobile terminal;
    a control unit connected to the transceiver, the control unit comprising:
        a retransmission controller to send acknowledgment signals to the mobile terminals over respective acknowledgement channels to acknowledge uplink transmissions from the of mobile terminals, and
        a scheduler to schedule the uplink transmission from the mobile terminals and to assign resources on a downlink control channel to the acknowledgment channels;
    wherein the scheduler is configured to:
        determine, for each acknowledgement channel, a required transmit energy per resource element (TEPRE) based on the channel conditions experienced by a corresponding mobile terminal assigned to the acknowledgement channel;
        assign, in sorted order depending on the required TEPREs, each acknowledgement channel to a channel group, wherein acknowledgement channels in the same channel groups share the same downlink resources; and
    wherein the scheduler is configured to determine the required TEPRE for each acknowledgement channel by:
        determining a reference signal transmit energy;
        estimating a signal quality of the acknowledgement channel;
        determining a target signal quality to meet a predetermined error performance requirement; and
        computing the required TEPRE for the acknowledgement channel from the reference signal transmit energy, estimated signal quality of the acknowledgement channel, and target signal quality.

15. The base station of claim 14, wherein the scheduler is configured to assign each acknowledgment channel to a channel group by:
    determining one or more available channel groups based on uplink resources assigned to the corresponding mobile terminal; and
    determining, for each available channel group, a cumulative transmit energy for the channel group as a function of the required TEPREs of the acknowledgement channels within the channel group; and
    assigning the acknowledgement channel to the available channel group with the minimum cumulative transmit energies.

16. The base station of claim 15, wherein the scheduler is configured to determine the one or more available channel groups based on uplink resources assigned to the corresponding mobile terminal by determining which channel groups have unassigned spreading sequences that can be assigned to the acknowledgement channel.

17. The base station of claim 15, wherein the scheduler is configured to determine the cumulative transmit energy for the channel groups by summing the required TEPREs of all acknowledgement channels assigned to the channel group.

18. The base station of claim 17, wherein the scheduler is configured to assign, to each acknowledgement channel, an available spreading sequence within the assigned channel group.

19. The base station of claim 14, for a multiple-input, multiple output (MIMO) system wherein the scheduler is further configured to jointly assign the acknowledgement channels for a mobile terminal pair to respective channel groups.

20. The base station of claim 19, wherein the scheduler is configured to jointly assign the acknowledgement channels for a mobile terminal pair to respective channel groups by:
    determining one or more available channel group pairs based on uplink resources assigned to the mobile terminal pair; and
    determining, for each available channel group pair, a sum of the cumulative transmit energies for the channel group pair; and
    assigning the acknowledgement channels to the available channel group pair with the minimum cumulative required TEPREs.

21. The base station of claim 20, wherein the scheduler is configured to determine the one or more available channel groups pairs by finding a pair of channel groups having unassigned spreading sequences that can be assigned to respective ones of the acknowledgement channels so that cyclic shifts of demodulation reference signals for corresponding Physical Uplink Shared Channel transmissions are separated by a predetermined minimum distance.

22. The base station of claim 21, wherein the scheduler is configured to determine the sum of the cumulative transmit energies for the channel group pair by summing the required TEPREs of all acknowledgement channels assigned to the channel group pair.

23. The base station of claim 19, wherein the scheduler is further configured to jointly assign spreading sequences to the acknowledgement channels for the mobile terminal pair.

24. The base station of claim 23, wherein the scheduler is configured to jointly assign spreading sequences to the acknowledgement channels for the mobile terminal pair by assigning spreading sequences from respective channel groups in the channel group pair so that cyclic shifts of demodulation reference signals for corresponding Physical Uplink Shared Channel transmissions are separated by a predetermined minimum distance.

25. The base station of claim 14, wherein the scheduler is configured to determine the transmit energy for each acknowledgement channel by:
   determining a channel gain metric for a reference signal; and
   computing a required TEPRE from a predetermined fixed transmit energy and the channel gain metric.

26. The base station of claim 14, wherein the scheduler is configured to determine the transmit energy for each acknowledgement channel by:
   determining a control channel transmit energy;
   determining an offset as a function of a coding rate, number of channel elements for the control channel, or both; and
   computing a required TEPRE from the control channel transmit energy and the offset.

* * * * *

UNITED STATES PATENT AND TRADEMARK OFFICE
CERTIFICATE OF CORRECTION

PATENT NO. : 8,842,565 B2
APPLICATION NO. : 13/392300
DATED : September 23, 2014
INVENTOR(S) : Ren et al.

Page 1 of 1

It is certified that error appears in the above-identified patent and that said Letters Patent is hereby corrected as shown below:

On the Title Page, item (56), under "OTHER PUBLICATIONS", in Column 2, Line 3, delete "Edinbrugh," and insert -- Edinburgh, --, therefor.

In the Drawings

In Fig. 6, Sheet 6 of 9, for Tag "132", in Line 1, delete "TEPREFOR" and insert -- TEPRE FOR --, therefor.

In the Specification

In Column 11, Line 48, delete "MD" and insert -- FDD --, therefor.

Signed and Sealed this
Twenty-fourth Day of November, 2015

Michelle K. Lee
*Director of the United States Patent and Trademark Office*